United States Patent
Oh et al.

(10) Patent No.: US 6,607,575 B2
(45) Date of Patent: Aug. 19, 2003

(54) GRILL ASSEMBLY OF A CYCLONE DUST COLLECTING APPARATUS FOR A VACUUM CLEANER

(75) Inventors: Jang-keun Oh, Gwangju (KR); Joo-suck Jung, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/080,427

(22) Filed: Feb. 22, 2002

(65) Prior Publication Data

US 2002/0178698 A1 Dec. 5, 2002

(30) Foreign Application Priority Data

Jun. 2, 2001 (KR) .................................... 2001-0031009

(51) Int. Cl.[7] .............................................. B01D 45/12
(52) U.S. Cl. ......................... 55/413; 55/426; 55/459.1; 55/DIG. 3
(58) Field of Search ........................ 55/413, 424, 426, 55/459.1, DIG. 3; 15/350, 353

(56) References Cited

U.S. PATENT DOCUMENTS

| | | | |
|---|---|---|---|
| 409,025 A | * | 8/1889 | Downton ...................... 55/296 |
| 964,428 A | * | 7/1910 | Johnson et al. ............... 55/415 |
| 2,071,975 A | * | 2/1937 | Holm-Hansen et al. ....... 55/413 |
| 5,078,761 A | | 1/1992 | Dyson |
| 6,195,835 B1 | | 3/2001 | Song et al. |

FOREIGN PATENT DOCUMENTS

| | | |
|---|---|---|
| EP | 1157650 | 11/2001 |
| GB | 2363744 | 1/2002 |

* cited by examiner

Primary Examiner—Robert A. Hopkins
(74) Attorney, Agent, or Firm—Ladas & Parry

(57) ABSTRACT

A grill assembly of a cyclone dust collecting apparatus for a vacuum cleaner capable of improving dust collecting efficiency of the vacuum cleaner by preventing the filth, drawn thereinto with the air, from being directly drawn into a grill without forming a whirling air current. The grill assembly is disposed at an upper part of an air discharging passage of a cyclone body that generates the whirling air current from the air drawn thereinto and separates filth from the whirling air by a centrifugal force. The grill assembly prevents the filth from being drawn into a vacuum-generating device of the vacuum cleaner and comprises a cylindrical grill body having upper and lower openings, with the outer diameter of the upper part being greater than the outer diameter of the lower part, and a plurality of passages formed at the cylindrical grill body.

6 Claims, 3 Drawing Sheets

GRILL ASSEMBLY OF A CYCLONE DUST COLLECTING APPARATUS FOR A VACUUM CLEANER

BACKGROUND OF THE INVENTION

1. Field of the Invention

The present invention relates to a cyclone dust collecting apparatus for a vacuum cleaner, and more particularly to a grill assembly of a cyclone dust collecting apparatus for a vacuum cleaner capable of preventing backflow of the filth like hair to a vacuum-generating device.

2. Description of the Related Art

FIG. 1 shows one example of a conventional cyclone dust collecting apparatus for a vacuum cleaner. According to FIG. 1, the conventional cyclone dust collecting apparatus 10 for a vacuum cleaner comprises a cyclone body 20, a filth-collecting portion 30, and a partition 40.

An air suction passage 21, connected with a brush assembly (not shown) of the vacuum cleaner, is disposed at an upper part of the cyclone body 20. The air, which is drawn through the air suction passage 21 forms a whirling air current as it is drawn to a tangential direction of the cyclone body 20.

An air discharging passage 22, connected with a vacuum-generating device (not shown) of the vacuum cleaner, is disposed at an upper center of the cyclone body 20. A grill 23 is disposed at an inlet of the air discharging passage 22 for preventing filth such as hair from being drawn to the vacuum-generating device.

For the conventional cyclone dust collecting apparatus 10 of a vacuum cleaner with the above construction, the filth-laden air from the cleaning surface is drawn to the cyclone body 20 through the air suction passage 21 and the brush assembly when the vacuum-generating device of the vacuum cleaner is operated. The air, drawn into the cyclone body 20, forms a whirling air current and filth, contained in the air, is separated by a centrifugal force of the whirling air current and collected in a filth-collecting portion 30. The cleaned air flows to the vacuum-generating device through the passage 24 of the grill 23 and the air discharging passage 22.

However, as shown, for the conventional cyclone dust collecting apparatus 10, since the grill 23 is formed very closely to the air suction passage 21, some filth, drawn thereinto through the air suction passage 21, cannot form a whirling air current and is directly drawn into the grill 23. This phenomenon is aggravated at an upper part of the grill 23 that is close to the air suction passage 21 rather than a lower part of the grill 23 that is far from the air suction passage 21. Therefore, the dust collecting efficiency of the vacuum cleaner is decreased. Accordingly, there is a need for improvements in these type devices.

SUMMARY OF THE INVENTION

The present invention has been made to overcome the above-mentioned problems of the related art. Accordingly, the present invention provides a grill assembly for a dust collecting apparatus for a vacuum cleaner that is capable of improving dust collecting efficiency of the vacuum cleaner by preventing filth, drawn through an air suction passage of a cyclone body with the air, from being directly drawn into the grill without forming a whirling air current.

This is accomplished by providing a grill assembly of a cyclone dust collecting apparatus for a vacuum cleaner, disposed at an upper part of an air discharging passage of a cyclone body that generates whirling air current from the air drawn thereinto and separates filth from the whirling air by a centrifugal force. The grill assembly for preventing the filth from being drawn into a vacuum-generating device of the vacuum cleaner comprises a cylindrical grill body having upper and lower openings at respective upper and lower parts, with the outer diameter of the upper part being greater than the outer diameter of the lower part, and a plurality of passages formed at the cylindrical grill body. The cylindrical grill assembly further comprises a shielding member that includes a lower opening having an outer diameter that is greater than the outer diameter of the upper part of the cylindrical grill body.

DETAILED DESCRIPTION OF THE PREFERRED EMBODIMENT

The preferred embodiment of the present invention will be described referring to the accompanying drawing figures.

Figure 2:
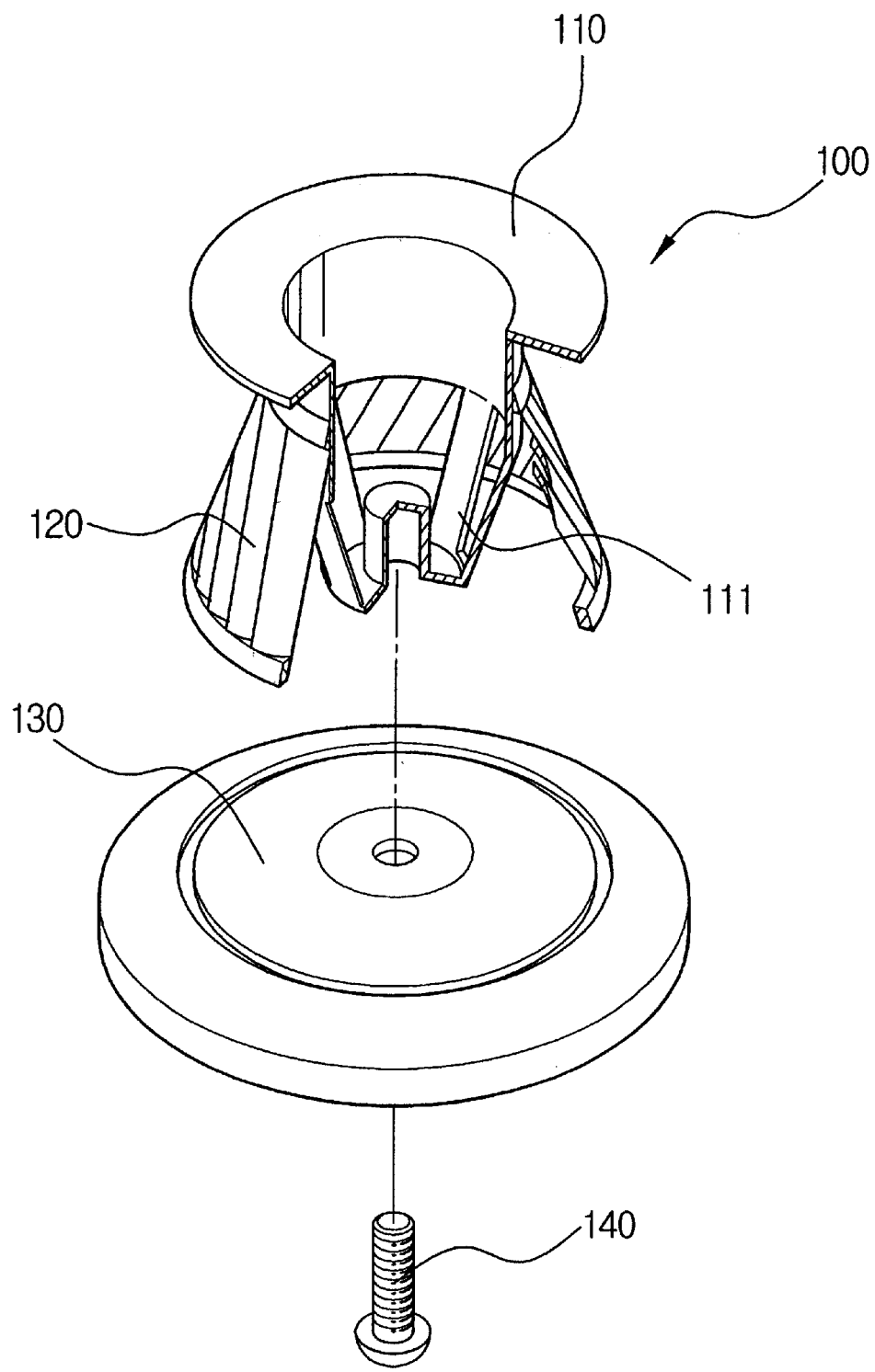
FIG. 2 is an exploded perspective view showing a grill assembly of the cyclone dust collecting apparatus for the vacuum cleaner according to the present invention.

FIG. 2 shows one example of a grill assembly of a cyclone dust collecting apparatus for a vacuum cleaner according to the present invention. According to FIG, 1, the grill assembly 100 of the cyclone dust collecting apparatus for the vacuum cleaner of the present invention includes a grill body 110, a plurality of blades 120, and a shielding member 130.

Figure 3:
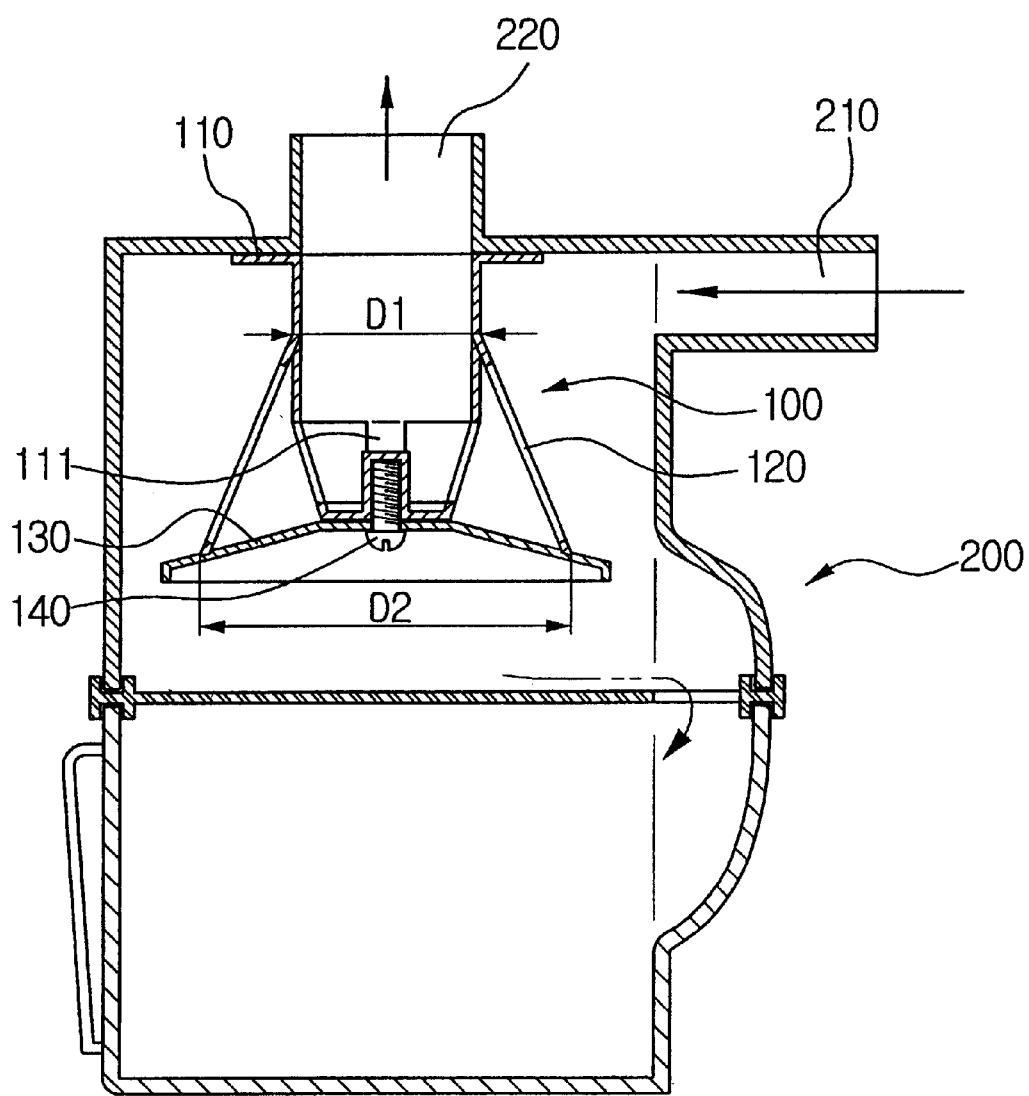
FIG. 3 is a sectional view showing the grill assembly of the cyclone dust collecting apparatus for the vacuum cleaner being constructed at the cyclone body according to the present invention.

The grill body 110 has opened upper and lower ends. As shown in FIG. 3, the upper opening of the grill body 110 is connected with an air discharging passage 220 of a cyclone body 200, and the lower opening is shielded by the shielding member 130.

The shielding member 130 is screwed to a bracket 111 integrally formed with the grill body 110 by a screw 140. In other words, the shielding member 130 can be removed from the grill body 110 by unscrewing the screw 140, and thus, the maintenance and repair of the grill assembly 100 becomes easier.

Figure 1:
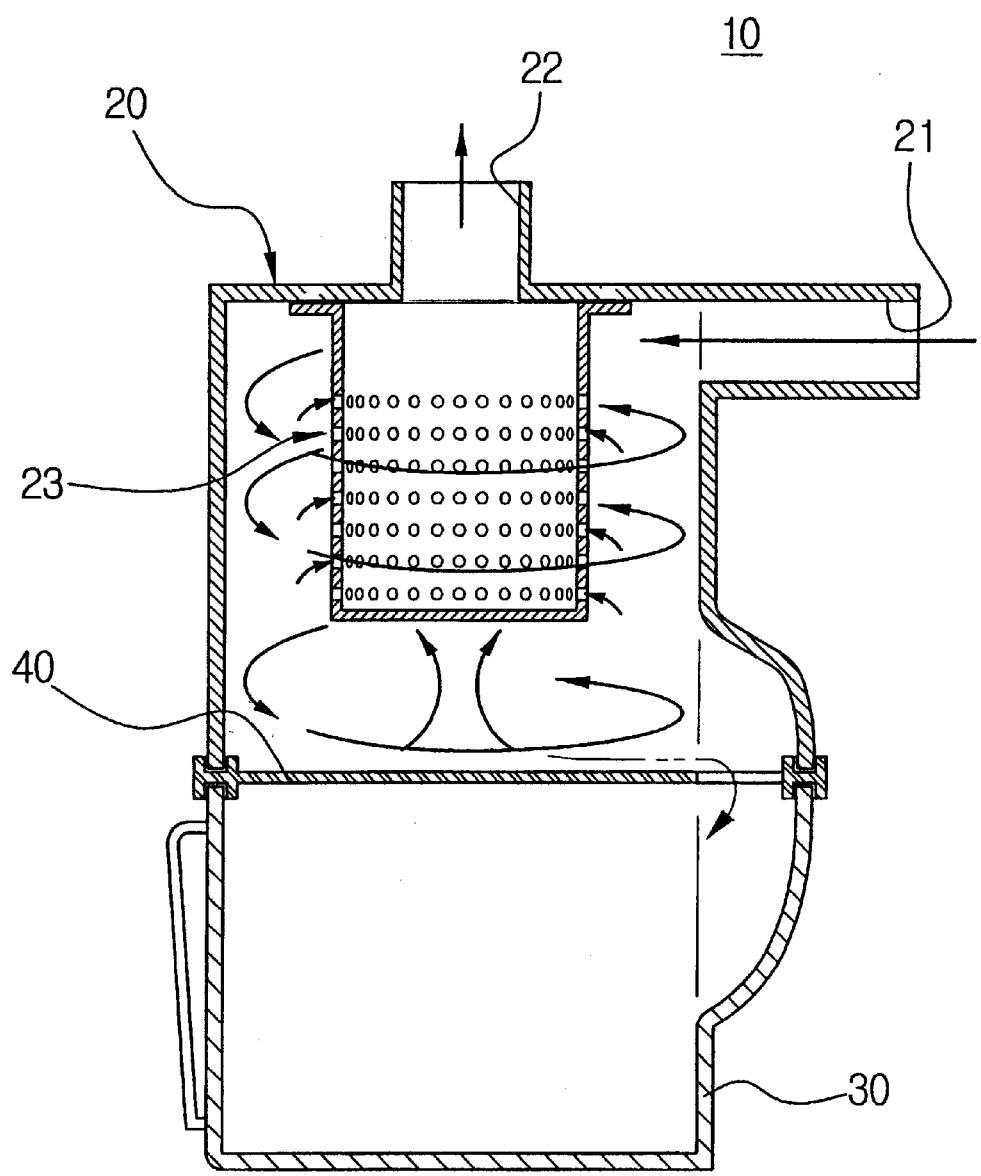
FIG. 1 is a sectional view showing a conventional cyclone dust collecting apparatus of a vacuum cleaner.

Also, the grill body 110 is formed to have a smaller outer diameter D1 at the upper part than the outer diameter D2 at the lower opening of the shielding member 130. In other words, the outer diameter D1 of the upper part of the grill body 110 is much shorter than the corresponding place of the conventional grill 23 as shown in FIG. 1, when the outer diameter D2 at the lower opening of the shielding member 130 is taken into account. Therefore, the grill body 110 is centrally placed away from the air suction port 210 of the cyclone body 200, so that the possibility of the filth drawn into through the air suction port 210 and into the grill assembly 100 without forming a whirling air current is reduced.

For the preferred embodiment of the present invention, the grill body 110 is in a frusto-conical shape, but the shape of the grill body 110 is not limited to this type only. In other words, the grill body 110 can be any type that meets the above condition.

For example, the grill body 110 can be a two-layered cylinder, or a combination of cylinder and a frusto-conical shape. It is preferable that the inner diameter of the upper end of the grill body 110 is formed as the same as the inner diameter of the air discharging passage 220 of the cyclone body 200.

The plurality of blades 120 are disposed at an outer circumference of the grill body 110 at a predetermined space separated from each other for air circulation. This spacing forms a passage between the blades 120.

FIG. 3 shows the grill assembly 100 with the above construction being disposed at the cyclone body 200. The grill assembly 100 is removably attached to the cyclone body 200 by connection means such as a screw (not shown).

On the other hand, if the vacuum-generating apparatus (not shown) of the vacuum cleaner is separated, the air containing various filth existing on the cleaning surface is drawn into the cyclone body 200 through the brush assembly (not shown) and the air suction passage 210. As described above, however, according to the grill assembly 100 of the cyclone dust collecting apparatus for the vacuum cleaner, the outer diameter of the upper part of the grill body 110 is much shorter than the same of the corresponding place of the conventional grill 23 as shown in FIG. 1. Accordingly, since the grill body 110 is placed far away from the air suction port 210 of the cyclone body 200, the possibility of the filth being directly drawn into the grill assembly 100 without forming a whirling air current is reduced.

As described so far, according to the grill assembly 100 of the cyclone dust collecting apparatus for the vacuum cleaner, the amount of the filth, directly drawn into the grill assembly 100 through the air suction passage 210 of the cyclone body 200, would be remarkably decreased. Although the preferred embodiment of the present invention has been described, it will be understood by those skilled in the art that the present invention should not be so limited. Various modifications can be made within the spirit and scope of the present invention and it is intended that the appended claims cover all such modifications.

What is claimed is:

1. Amended A grill assembly of a cyclone dust collecting apparatus for a vacuum cleaner, disposed at an upper part of an air discharging passage of a cyclone body that generates whirling air current from the air drawn thereinto and separates filth from the whirling air by centrifugal force, the grill assembly preventing the filth from being drawn into a vacuum-generating device of the vacuum cleaner, comprising:
    a cylindrical grill body having upper and lower parts;
    a shielding member, having a lower opening and an outer diameter, connected to the cylindrical grill body at the lower part thereof, the shielding member being formed such that the outer diameter of the upper part of the cylindrical grill body is less than the outer diameter of the lower opening of the shielding member; and
    a plurality of passages formed in the lower part of the cylindrical grill body.

2. The grill assembly of a cyclone dust collecting apparatus for a vacuum cleaner of claim 1, wherein the shielding member has a frusto-conical shape.

3. The grill assembly of a cyclone dust collecting apparatus for a vacuum cleaner of claim 1, wherein an inner diameter of the upper part of the cylindrical grill body is the same size as the inner diameter of the air discharging passage of the cyclone body.

4. A vacuum cleaner comprising a vacuum-generating device, a cyclone dust collecting apparatus operatively associated with the vacuum-generating device, a grill assembly for the cyclone dust collecting apparatus, disposed at an upper part of an air discharging passage of a cyclone body that generates whirling air current from the air drawn thereinto and separates filth from being drawn into the vacuum-generating device, and comprising:
    a cylindrical grill body having upper and lower parts;
    a shielding member, having a lower opening and an outer diameter, connected to the cylindrical grill body at the lower part thereof, the shielding member being formed such that the outer diameter of the upper part of the cylindrical grill body is less than the outer diameter of the lower opening of the shielding member; and
    a plurality of passages formed in the lower part of the cylindrical grill body.

5. The vacuum cleaner of claim 4, wherein the shielding member has a frusto-conical shape.

6. The vacuum cleaner of claim 4, wherein an inner diameter of the upper part of the cylindrical grill body is the same size as the inner diameter of the air discharging passage of the cyclone body.

* * * * *